United States Patent
Arora et al.

(10) Patent No.: US 12,143,718 B2
(45) Date of Patent: Nov. 12, 2024

(54) METHODS AND SYSTEMS FOR CAPTURING ENHANCED MEDIA IN REAL-TIME

(71) Applicant: SAMSUNG ELECTRONICS CO., LTD., Suwon-si (KR)

(72) Inventors: Shivam Arora, Karnataka (IN); Ankit Shukla, Karnataka (IN); Ashish Kumar Singh, Karnataka (IN); Abhijit Dey, Karnataka (IN); Kiran Nataraju, Karnataka (IN); Rajib Basu, Karnataka (IN); Amit Kumar Soni, Karnataka (IN); Rohan Claude D'Souza, Karnataka (IN); Amit Chowdhury, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/107,054

(22) Filed: Feb. 8, 2023

(65) Prior Publication Data

US 2023/0188848 A1    Jun. 15, 2023

Related U.S. Application Data

(63) Continuation of application No. 17/230,429, filed on Apr. 14, 2021, now abandoned.

(30) Foreign Application Priority Data

Apr. 14, 2020 (IN) .............................. 202041016142
Mar. 10, 2021 (IN) .............................. 202041016142

(51) Int. Cl.
*H04N 23/67* (2023.01)
*G02B 7/10* (2021.01)
(Continued)

(52) U.S. Cl.
CPC ........... *H04N 23/675* (2023.01); *G02B 7/102* (2013.01); *G02B 7/36* (2013.01); *G06T 5/20* (2013.01);
(Continued)

(58) Field of Classification Search
CPC .. H04N 23/675; H04N 23/611; H04N 23/667; G02B 7/102; G02B 7/36; G06T 5/003; G06T 5/20
See application file for complete search history.

(56) References Cited

U.S. PATENT DOCUMENTS 5,119,121 A    6/1992    Kobayashi et al.
5,915,133 A    6/1999    Hirai et al.
(Continued)

FOREIGN PATENT DOCUMENTS

EP    4030745 A1 *    7/2022
JP    2003-241069 A    8/2003
(Continued)

OTHER PUBLICATIONS

Communication dated Feb. 2, 2022 issued by the Intellectual Property India Patent Office in application No. 202041016142.
(Continued)

*Primary Examiner* — MeKonnen D Dagnew
(74) *Attorney, Agent, or Firm* — Sughrue Mion, PLLC

(57) ABSTRACT

The embodiments herein disclose methods and systems for switching between a macro and a non-macro sensing mode for capturing macro and non-macro media in real-time. A method for controlling an electronic device may include acquiring at least one frame; identifying an operation mode of the electronic device among a macro sensing mode and non-macro sensing mode based on at least one of focus data and blur data of the at least one frame; and acquiring at least one image by using an image sensor, from among a plurality (Continued)

of image sensors of the electronic device, corresponding to the operation mode.

20 Claims, 14 Drawing Sheets

(51) Int. Cl.
    *G02B 7/36*            (2021.01)
    *G06T 5/20*            (2006.01)
    *G06T 5/73*            (2024.01)
    *H04N 23/611*       (2023.01)
    *H04N 23/667*       (2023.01)

(52) U.S. Cl.
    CPC ............. *G06T 5/73* (2024.01); *H04N 23/611* (2023.01); *H04N 23/667* (2023.01)

(56) References Cited

U.S. PATENT DOCUMENTS

| | | | |
|---|---|---|---|
| 7,941,042 B2 | 5/2011 | Park et al. | |
| 8,144,240 B2 | 3/2012 | Song | |
| 8,872,959 B2 | 10/2014 | Lee | |
| 10,154,186 B2 | 12/2018 | Kang et al. | |
| 10,571,246 B2 | 2/2020 | Yamaguchi et al. | |
| 10,638,042 B2 | 4/2020 | Miyazaki | |
| 2007/0036427 A1 | 2/2007 | Nakamura et al. | |
| 2009/0074396 A1 | 3/2009 | Park et al. | |
| 2009/0237553 A1 | 9/2009 | Song | |
| 2010/0097488 A1* | 4/2010 | Suzuki | H04N 5/772 348/222.1 |
| 2011/0157456 A1 | 6/2011 | Hongu | |
| 2017/0013179 A1* | 1/2017 | Kang | H04N 23/631 |
| 2017/0208239 A1* | 7/2017 | Chien | H04N 23/667 |
| 2017/0230585 A1* | 8/2017 | Nash | H04N 17/002 |
| 2018/0070005 A1 | 3/2018 | Chien | |

FOREIGN PATENT DOCUMENTS

| | | |
|---|---|---|
| JP | 2007-306282 A | 11/2007 |
| JP | 4024404 B2 | 12/2007 |
| JP | 2013-231870 A | 11/2013 |
| JP | 6013019 B2 | 10/2016 |
| KR | 10-2009-0125602 A | 12/2009 |
| KR | 1020120048397 A | 5/2012 |
| KR | 101411906 B1 | 6/2014 |
| KR | 101415872 B1 | 7/2014 |
| KR | 1020170006559 A | 1/2017 |

OTHER PUBLICATIONS

Communication dated Jul. 28, 2021, issued by the International Searching Authority in counterpart International Application No. PCT/KR2021/004642 (PCT/ISA/210 and 237).
Communication dated Dec. 22, 2022, issued by the European Patent Office, in corresponding Application No. 21789384.1.
Communication issued Sep. 14, 2023 by the European Patent Office in corresponding European Application No. 21789384.1.
Communication issued May 16, 2024 by the European Patent Office for EP Patent Application No. 21789384.1.

* cited by examiner

METHODS AND SYSTEMS FOR CAPTURING ENHANCED MEDIA IN REAL-TIME

CROSS REFERENCE TO RELATED APPLICATION(S)

This application is a continuation application of U.S. patent application Ser. No. 17/230,429, filed on Apr. 14, 2021, which is based on and claims priority under 35 U.S.C. § 119 to Indian Provisional Patent Application No. 202041016142, filed on Apr. 14, 2020, in the Indian Patent Office, and Indian Complete Patent Application No. 202041016142, filed on Mar. 10, 2021, in the Indian Patent Office, the disclosures of which are incorporated by reference herein in their entireties.

BACKGROUND

1. Field

The present disclosure relates to the field of capturing media, and, more particularly, to performing scene analysis to switch between a macro and a non-macro sensing mode for capturing macro and non-macro media in real-time.

2. Description of Related Art

Macro photography involves capturing extremely close or nearby subjects and living organisms, such as insects, and the like, which are very small in size. An electronic device can capture macro subjects. To capture the macro subjects, the user analyses the scene and manually switches the electronic device to a macro sensing mode. Thus, failing to switch the electronic device to the macro sensing mode can generate low-quality media from at least one non-macro sensor. Similarly, the user has to explicitly switch the electronic device back to at least one non-macro sensor to capture the subjects in a non-macro sensing mode.

FIG. 1 is an example diagram illustrating a conventional method for manually switching the camera between macro and non-macro sensors. The conventional method involves the user operating the electronic device in a default or non-macro sensing mode, which can provide blurry and low-quality media of the macro scenes. Further, the user analyzes the macro scene, and manually switches the camera to the macro sensor. In a similar manner, when the camera is in macro sensing mode, the user analyses that the captured scene is blurred due to non-macro subjects. Thereby, the conventional method requires the user to switch the camera to the non-macro sensing mode.

Therefore, the conventional method requires user intervention to switch the camera between the desired capturing mode based on the scene, which is time-consuming and can provide low-quality media. Thus, the conventional method provides static solutions without any intelligent components to switch the camera between the capturing modes based on the scenes, which makes them less effective.

SUMMARY

The example embodiments herein disclose methods and systems for analyzing a scene and switching between at least one macro sensing mode and at least one non-macro sensing mode for capturing macro media and non-macro media in real-time.

The example embodiments herein disclose methods and systems for configuring a macro camera and non-macro camera in the background of the electronic device for analyzing a scene.

The example embodiments herein disclose methods and systems for analyzing a scene using at least one of focus data-based analysis, blur detection-based analysis, face-detection, and light condition.

Accordingly, the embodiments herein provide methods and systems for analyzing the scene and switching between at least one macro sensing mode and at least one non-macro sensing mode for capturing macro media and non-macro media in real-time. According to an aspect of the disclosure, a method for controlling an electronic device may include acquiring at least one frame; identifying an operation mode of the electronic device among a macro sensing mode and non-macro sensing mode based on at least one of focus data and blur data of the at least one frame; and acquiring at least one image by using an image sensor, from among a plurality of image sensors of the electronic device, corresponding to the operation mode.

Accordingly, the embodiments herein provide methods and systems for analyzing a scene and switching between at least one macro sensing mode and at least one non-macro sensing mode for capturing macro media and non-macro media in real-time. A method disclosed herein includes analyzing at least one frame captured by at least one media acquisition unit wherein the analysis comprises a focus data-based scene analysis, a blur detection-based scene analysis. The method includes capturing at least one scene by at least one media acquisition unit by switching between at least one macro sensing mode and at least one non-macro sensing mode.

Accordingly, embodiments herein provide a system for analyzing a scene and switching between at least one macro sensing mode and at least one non-macro sensing mode for capturing macro media and non-macro media in real-time. Embodiments here provide a system comprising at least one macro camera, at least one non-macro camera, a processor to analyze at least one frame captured by at least one media acquisition unit wherein the analysis comprises a focus data-based scene analysis, a blur detection-based scene analysis. Further, the system captures at least one scene by at least one media acquisition unit by switching between at least one macro sensing mode and at least one non-macro sensing mode.

Accordingly, at least one macro sensing mode may utilize at least one macro sensor or any other sensors with macro capturing capabilities such as the ultra-wide sensor, or the like.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
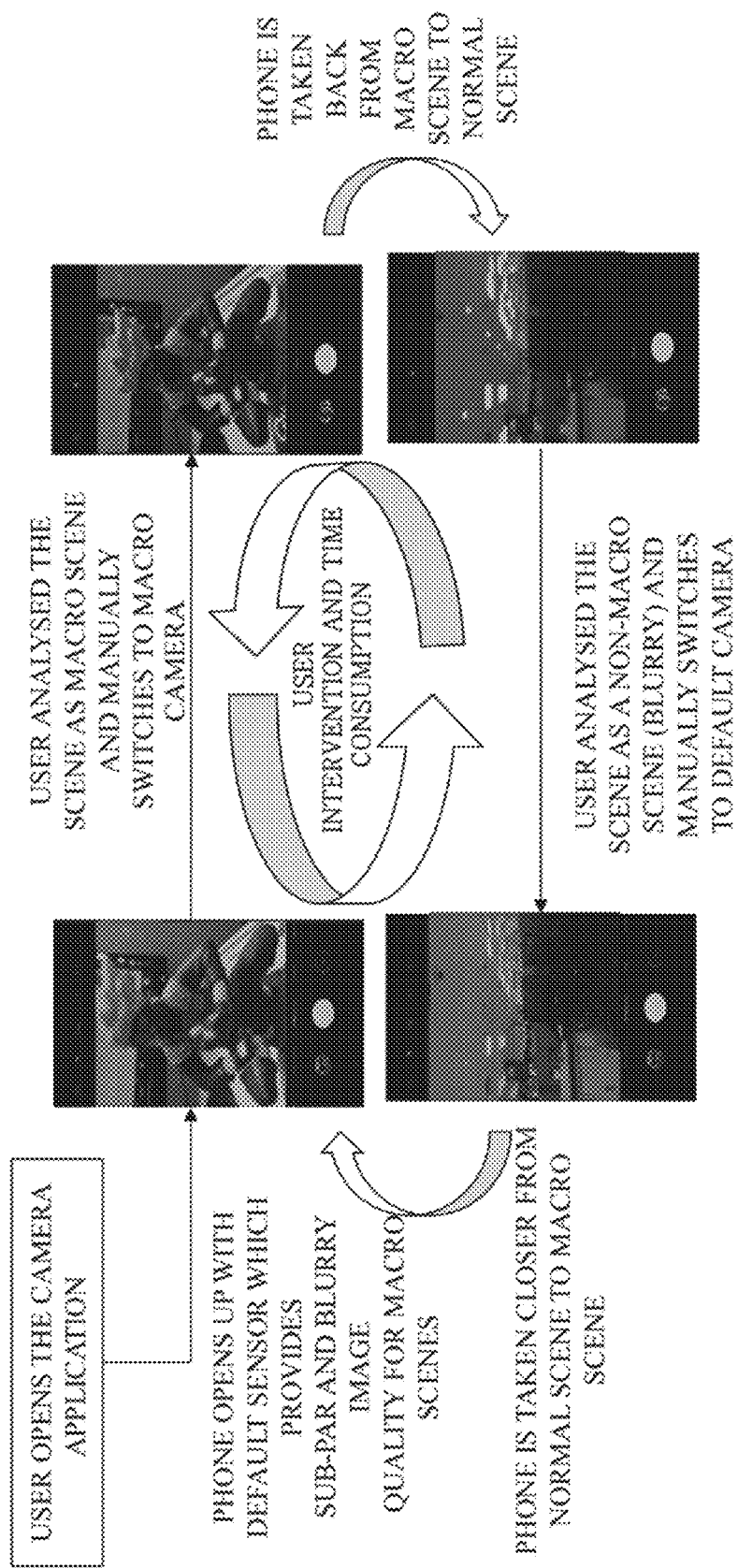
FIG. 1 is an example diagram illustrating a conventional method for manually switching the camera between a macro and a non-macro sensor.

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

Embodiments herein relate to methods and systems for analyzing the scene and switching between at least one macro sensing mode and at least one non-macro sensing mode for capturing macro media and non-macro media in real-time.

Referring to the drawings, and more particularly to FIGS. 2 through 14, where similar reference characters denote corresponding features consistently throughout the figures, there are shown example embodiments.

Figure 2:
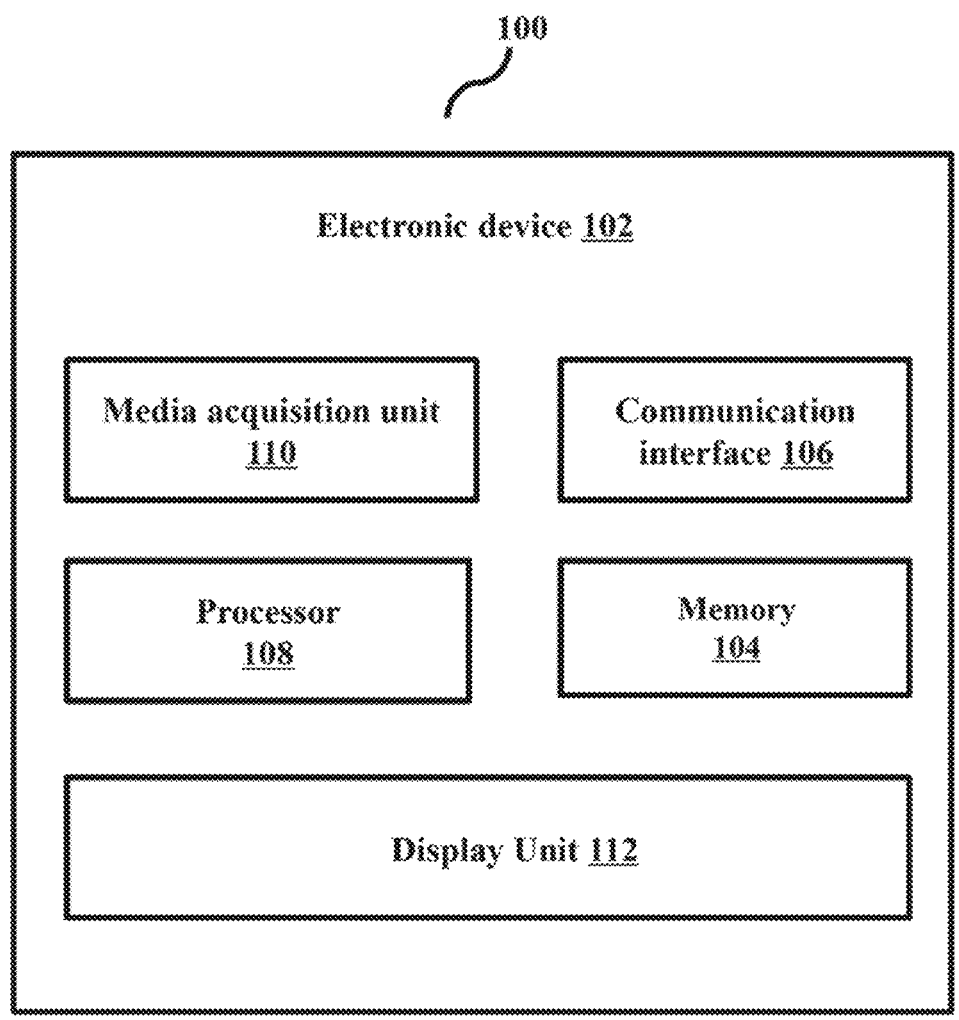
FIG. 2 depicts a block diagram illustrating various units of an electronic device, according to embodiments as disclosed herein.

FIG. 2 depicts a block diagram illustrating various units of an electronic device, according to embodiments as disclosed herein. FIG. 2 illustrates an environment 100 for analyzing the scene and switching between at least one macro and at least one non-macro sensing mode for capturing macro and non-macro media in real-time, according to embodiments as disclosed herein.

In the disclosure, the macro sensing mode refers to an operation mode of the electronic device 102 (or the media acquisition unit 110) in which an image is acquired using a macro image sensor, and the non-macro sensing mode refers to an operation mode of the electronic device 102 (or the media acquisition unit 110) in which an image is acquired using a non-macro image sensor.

The electronic device 102 may include a memory 104, a communication interface 106, a processor 108, and a media acquisition unit 110. The electronic device 102 can be a stand-alone device or can be integrated with another device. Examples of the electronic device 102 can be, but are not limited to, a computer, a laptop, a smartphone, a mobile phone, a wireless phone, an IoT device, a wearable device, a video phone, a personal computer (PC), a netbook computer, a personal digital assistant (PDA) connected through a communication network, and the like.

In an embodiment herein, the electronic device 102 may be connected through the communication network and/or at least one other communication network. The communication network may include at least one of, but is not limited to, a wired network, a value-added network, a wireless network, a satellite network, or a combination thereof. Examples of the wired network may be, but are not limited to, a Local Area Network (LAN), a Wide Area Network (WAN), an Ethernet network, and so on. Examples of the wireless network may be, but are not limited to, a cellular network, a wireless LAN (e.g., a Wi-Fi network), a Bluetooth network, a Bluetooth low energy network, a Zigbee network, a Wi-Fi Direct (WFD) network, an Ultra-wideband (UWB) network, an infrared data association (IrDA) network, a near field communication (NFC) network, and the like. In another example, the electronic device 102 may be connected directly to another device, such as a cloud-based server (e.g., via direct communication, via an access point, etc.). In another example, the electronic device 102 may be connected to a cloud-based server to enable the user to capture macro or non-macro subjects. In another example, the electronic device 102 may use on-device information to capture macro or non-macro subjects. Using the on-device information, the electronic device may analyze the current sensing mode to capture the subjects. In another example, the electronic device 102 may be connected to another electronic device via a relay, a hub, or a gateway. It is understood that the electronic device 102 and the cloud-based server may be connected to each other in any of various manners (including those described above) and may be connected to each other in two or more of various manners (including those described above) at the same time.

The electronic device 102 may be a device that enables a user(s) to capture macro or non-macro media by switching the electronic device 102 according to the scene. In an embodiment, the electronic device 102 may be a user device that is being used by the user to connect, and/or interact, and/or control a plurality of other devices.

The cloud-based server may be a server that receives, stores, and manages device information mappings, functional capabilities, manufacturer provided information, and location information of the electronic device 102 present in a network environment. The device information may include information such as, but is not limited to, an identification value of the electronic device 102, a device type, etc. In an example herein, the identification value may be, but is not limited to, a Media Access Control (MAC) identifier (MAC ID), a serial number, a unique device ID, etc. The location information includes information related to a location of the electronic device 102. The manufacturer provided information of the electronic device 102 may include at least one of, but is not limited to, a model of the electronic device 102, a year of manufacture of the electronic device 102, a lifespan of the electronic device 102, an operating system being used by the electronic device 102, a current version of the operating system being used by the electronic device 102, etc. The cloud-based server may update the device information, the functional capabilities, and location information of the electronic devices 102 in the cloud environment.

The media acquisition unit 110 may comprise a plurality of image sensors, and the plurality of image sensors may comprise at least one macro image sensor and at least one non-macro image sensor. The macro image sensor may be referred to as 'a macro camera' or 'a macro lens,' and the non-macro image sensor may be referred to as 'a non-macro camera' or 'a non-macro lens.' Specifically, the macro image sensor refers to an image sensor having a photographic magnification greater than or equal to a preset threshold value, and the non-macro image sensor refers to an image sensor having a (maximum) magnification less than the preset threshold value. For example, the macro image sensor has an ability to focus from infinity to 1:1 magnification for close-up photography, and the non-macro image sensor has a lower magnification than the macro image sensor.

In an embodiment herein, the electronic device 102 can be integrated with another device such as, but not limited to, a mobile phone, a smartphone, a tablet, a phablet, a personal digital assistant (PDA), a computer, a laptop, a phone, an IoT device, a wearable device, a smart watch, a vehicle infotainment system, a Television (TV), a camera, etc. The electronic device 102 may also have access to databases for fetching information related to at least one query received from the user. In addition, the electronic device 102 may further connect to at least one of a cloud, a dedicated user interaction device cloud, another server, etc., using at least one communication network for accessing information related to at least one query received from the user. Examples of the communication network can be, but are not limited to, the Internet, a wired network (e.g., a LAN, an Ethernet network, etc.), a wireless network (e.g., a Wi-Fi network, a cellular network, a Wi-Fi Hotspot, a Bluetooth network, a Zigbee network, etc.), and the like.

In an embodiment, the environment 100 may include the electronic device 102, which communicates through a communication network, as illustrated in FIG. 2.

As illustrated in FIG. 2, the media acquisition unit 110 can be configured to capture media inputs (e.g., a video input, an image input, or any media input) from an environment including extremely close or nearby subjects and living organisms. The media acquisition unit 110 may also capture the media inputs from the environment including default objects such as normal images, group images, landscape images, nature images, candid images, family images, and the like (e.g., subjects and/or objects of normal range).

The media acquisition unit 110 can be any kind of device used to capture media. The media acquisition unit 110 can be, but is not limited to, a digital camera, a media capturing device, a web camera, a Single-lens reflex (SLR) camera, a Digital SLR (DSLR) camera, mirrorless cameras, compact cameras, video recorders, digital video recorders, and the like. The media can be, but is not limited to video, images, and the like.

The macro sensing mode and non-macro sensing mode can be configured on the media acquisition unit 110 to capture macro media and non-macro media. The macro-sensing mode and the non-macro sensing mode of the media acquisition unit 110 assist in switching the media acquisition unit 110 to capture macro media and non-macro media. Therefore, the macro sensing mode and the non-macro sensing mode of the media acquisition unit 110 can be configured to run in parallel in the background of the electronic device 102 to analyze the captured scene by the media acquisition unit 110. Thus, the media acquisition unit 110 of the electronic device can switch between the macro sensing mode and the non-macro sensing mode, based on the analysis of the captured scene. Also, the macro sensing mode may utilize at least one macro sensor or any other sensors with macro capturing capabilities such as an ultra-wide sensor, or the like.

The captured media is analyzed based on parameters such as, but not limited to, focus data, blur detection, face-detection and lighting to capture the scene by the media acquisition unit 110. The parameters are analyzed to decide whether the electronic device 102 is to be switched between the macro sensing mode and the non-macro sensing mode.

The focus data-based scene analysis includes analyzing the focus data acquired from the auto-focus module of the media acquisition unit 110 to classify the scene in accordance with the macro sensing mode and the non-macro sensing mode. Auto-focus is a focusing system to automatically control the optics in the lens which brings the subject to focus.

The blur detection-based scene analysis includes using the captured frame to determine the amount of blur in the scene. Based on the amount of blur present in the captured frame, the processor 109 may determine whether the switching is to be performed between the macro sensing mode and the non-macro mode.

Face-detection based scene analysis includes detecting the presence of faces present in the captured scene. Based on determining that at least one face is present in the scene, switching to the macro sensing mode is avoided. The sensing mode may remain in the non-macro sensing mode based on detecting the presence of faces in the captured scene.

A check is also made to determine if there is sufficient light for capturing the media.

The respective analysis parameter is compared to a predefined threshold value. Based on determining that the analysis parameter exceeds the threshold value, the switching is initiated. The processor 108 can switch the electronic device 102 between the macro sensing mode and the non-macro sensing mode. The threshold value depends on the media acquisition unit 110 and the electronic device 102. The threshold value for each parameter (i.e., for blur detection based scene analysis, focus data based scene analysis, and light condition based analysis) may be termed as blur threshold, focus based threshold, and light based threshold. The threshold value may be determined based on the imaging properties of the media acquisition unit 110 present in the electronic device 102.

The memory 104 of the electronic device 102 may store at least one of, but not limited to, the information related to the analyzed parameters such as focus, blur, face-detection, and lighting to capture the scene by the media acquisition unit 110. The memory 104 may also include the relative lens position, blur value, the number of faces present in the captured scene, and the current light conditions to analyze the scene on the electronic device 102. The memory 104 may include at least one type of storage medium from among a flash memory type storage medium, a hard disk type storage medium, a multi-media card micro type storage medium, a card type memory (e.g., a secure digital (SD) or an extreme digital (XD) memory), a random-access memory (RAM), a static RAM (SRAM), a read-only memory (ROM), an electrically erasable programmable ROM (EEPROM), programmable ROM (PROM), a magnetic memory, a magnetic disk, or an optical disk.

The communication interface 106 may include one or more components configured to communicate with another device (e.g., another electronic device, the cloud server, etc.) using data communication methods that are supported by the communication network. The communication interface 106 may include components such as a wired communicator, a short-range communicator, a mobile/wireless communicator, and a broadcasting receiver. The wired communicator may enable the electronic device 102 to communicate with other devices (e.g., another electronic device, the cloud-based server, a plurality of devices, etc.) using the communication methods such as, but not limited to, wired LAN, Ethernet, etc. The short-range communicator may enable the electronic device 102 to communicate with other devices using the communication methods such as, but not limited to, BLE, NFC, WLAN (or Wi-Fi), Zigbee, IrDA, WFD, UWB communication, Ant+ (interoperable wireless transfer capability) communication, shared wireless access protocol (SWAP), wireless broadband internet (Wibro), wireless gigabit alliance (WiGiG), and so on.

The processor 108 may include one or more processors. The processor 108 may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The processor 108 may be configured to switch the electronic device between a macro-sensing mode and a non-macro sensing mode. The processor 108 includes various components such as a scene capturing module 302, a scene an analysis module 304, and a scene switching module 306 to capture the scene by the media acquisition unit 110. Based on checking the analyzed parameters, the processor 108 determines the corresponding camera to be used to display the objects and/or subjects on the display unit 112. The processor 108 determines one or more of the frames of the captured scene to satisfy the corresponding condition of the analysis parameter to perform the switching between the macro sensing mode and the non-macro sensing mode.

The processor 108 can perform focus data-based scene analysis, wherein the processor 108 can use parameters such as, but not limited to, relative lens position, auto focus status of the objects present in the scene, defocus status and the light condition to capture the scene. Based on performing the focus data-based scene analysis, the processor 108 determines whether the scene is to be captured in the macro sensing mode or the non-macro sensing mode. The processor 108 calculates the amount of blur present in the captured scene to determine whether to switch between the macro sensing mode and the non-macro sensing mode. The processor 108 determines if any faces are present in the scene to determine whether to switch between the macro sensing mode and the non-macro sensing mode. The processor 108 combines the results of the focus data-based scene analysis, blur detection-based scene analysis, and face-detection based scene analysis to determine the current capturing mode. As the focus data-based scene analysis, blur-detection-based scene analysis and face-detection based scene analysis run in parallel in the background of the electronic device 102, the processor 108 combines the results of the mentioned analyses.

Based on combining the results of the analysis, the processor 108 further checks the light condition. Based on determining that the macro mode is to be used for capturing the media and that light conditions are sufficient, the processor 108 provides instructions to the macro camera to be active and switches the non-macro camera to an in-active state. The non-macro camera may be set as an auxiliary camera in the background of the electronic device 102.

The processor 108 stores the information related to the analyzed parameters. Further, the processor 108 causes the macro sensing mode and the non-macro mode to run in parallel in the background of the electronic device 102 to enable ease of switching between the sensing modes.

In an embodiment, one or a plurality of processors 108 can control the processing of the input data in accordance with a predefined operating rule stored in the non-volatile memory and the volatile memory. The predefined operating rule or the intelligence model can be provided through instruction(s) provided in the memory 104 present in the electronic device 102.

The display unit 112 may be configured to provide the output to the user(s). The display unit 112 provides the objects/subjects in the corresponding sensing mode based on the analyzed parameters.

In an example, if the electronic device 102 is a server, the display unit 112 may receive the output from the processor 108 and communicate the output to the electronic device 102 through the communication interface 106, to be displayed to the user.

In an example, if the electronic device 102 is a user device, the display unit 112 may receive the output from the processor 108 and include for example, but not limited to, a sound output unit, a display, a vibration motor, a User Interface (UI) module, etc., to provide the received output to the user. The output may be provided as, but not limited to, an image, a graphic, a video signal, text, etc. The sound output unit may be a speaker that receives the output from the processor 108, and provides the output as the audio signal to the user. The display unit 112 receives the output from the processor 108, and displays the output as at least one of an image, a video signal, text, or the like, to the user.

The UI module may provide a specialized UI or graphics user interface (GUI), or the like, to provide the output to the user.

Figure 3:
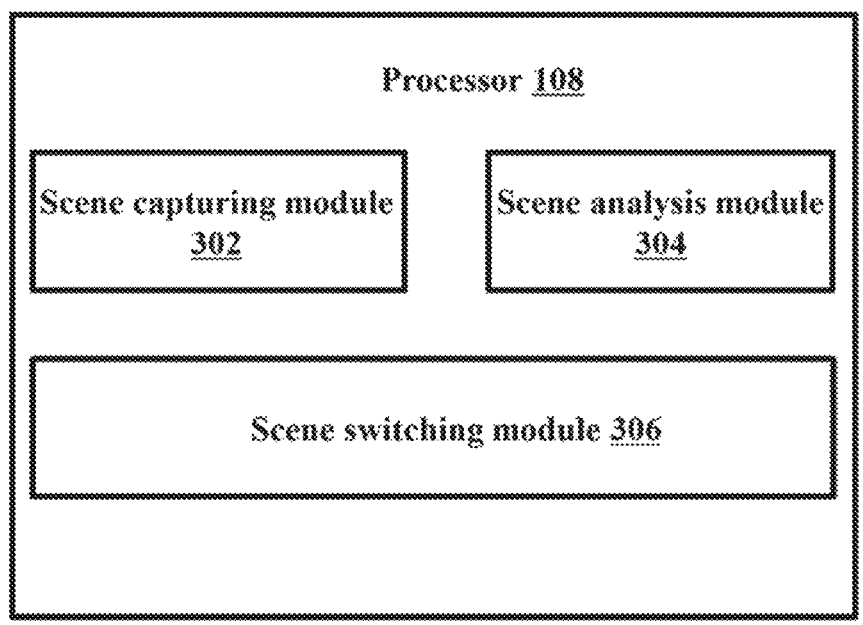
FIG. 3 depicts a block diagram illustrating various units of a processor of the electronic device to analyze the captured scene, according to embodiments as disclosed herein.

FIG. 3 depicts a block diagram illustrating various units of a processor 108 of the electronic device to analyze the captured scene based on various parameters, according to embodiments as disclosed herein. The processor 108 comprises a scene capturing module 302, a scene analysis module 304, and a scene switching module 306.

The scene capturing module 302 may include one or more cameras. The scene capturing module 302 may be configured to capture media. Examples of the media can be, but are not limited to, video, image, animations, scans, etc.

The scene analysis module 304 may analyze the captured media to determine the sensing mode that the electronic device 102 is to use to capture the scene effectively. Based on the analysis of the scene, the analysis module 304 determines whether the scene is to be captured using the macro sensing mode or the non-macro sensing mode.

The scene analysis module 304, based on determining the nature of scene, initiates the processor 108 to switch the electronic device 102 between the macro sensing mode and the non-macro sensing mode.

The scene switching module 306 performs the switch between the macro sensing mode and the non-macro sensing mode. Therefore, the switching of the camera by the scene switching module 306 is performed without any human intervention and can enhance the quality of the captured scene.

Figure 4:
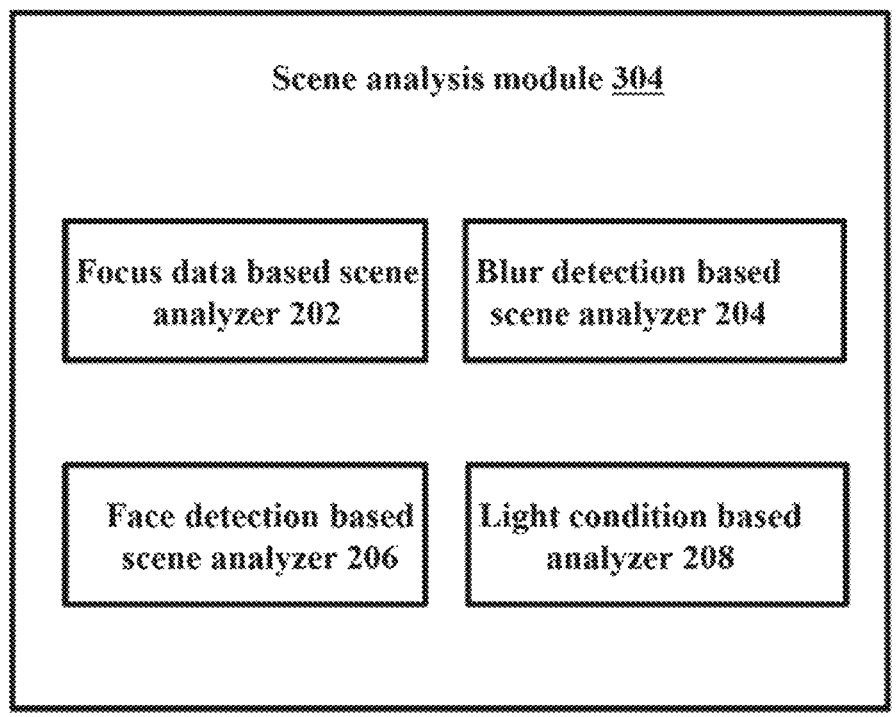
FIG. 4 depicts a block diagram illustrating various units of a scene analysis module to analyze the captured scene by the electronic device, according to embodiments as disclosed herein.

FIG. 4 depicts a block diagram illustrating various units of a scene analysis module to analyze the captured scene by the electronic device 102, according to embodiments as disclosed. The scene analysis module 304 includes a focus-data based scene analyzer 202, a blur detection-based scene analyzer 204, a face detection-based scene analyzer 206, and a light condition-based analyzer 208.

The focus data-based scene analyzer 202 uses focus related parameters such as relative lens position, auto focus state, de-focus state, and ambient light condition. The media acquisition unit 110 may comprise one or more cameras or any other device to capture the scene. The relative lens position relates to the position of the lens with respect to the actuator rail. The processor 108 tracks the relative lens position of the media acquisition unit 110. For example, there can be multiple ranges and, based on the range in which relative lens position falls, it can be approximated whether, the media acquisition unit 110 is moving away from or near to the objects being captured as a part of the scene and the processor 108 can switch between the non-macro sensing mode and the macro sensing mode. The boundaries for various ranges depend on the electronic device 102, macro camera, non-macro camera, and the media acquisition unit 110.

Based on a focus state of the macro camera or non-macro camera, the processor 108 can suggest the switching between the macro sensing mode and the non-macro sensing mode. The focus status can be at least one of trying to focus mode, focused mode, and not focused mode. The de-focus value of the media acquisition unit 110 determines the phase difference value between the phase difference pixels in the captured scene. If the phase difference value of the pixels captured from the scene is negative, then the processor 108 considers the object to be closer to the media acquisition unit 110. Based on the combination of the values of relative lens position, focus state and de-focus, the processor 108 switches between the macro sensing mode and the non-macro sensing mode.

The light condition determines the illumination of the current scene. The light condition-based scene analyzer 208 checks the current light conditions.

The blur detection-based scene analyzer 204 analyzes the amount of blur present in the scene being captured. The processor 108, based on determining that the amount of blur exceeds the threshold level, determines the sensing mode. For example, when the media acquisition unit 110 is in the macro sensing mode and the blur exceeds the threshold level, the processor 108 determines that the scene being captured is a non-macro scenario. In a similar manner, based on blur being present in the non-macro sensor, the processor 108 determines that the capturing scene is a macro scenario. The threshold value depends on the electronic device 102, macro camera, non-macro camera, and the media acquisition unit 110.

Figure 5:
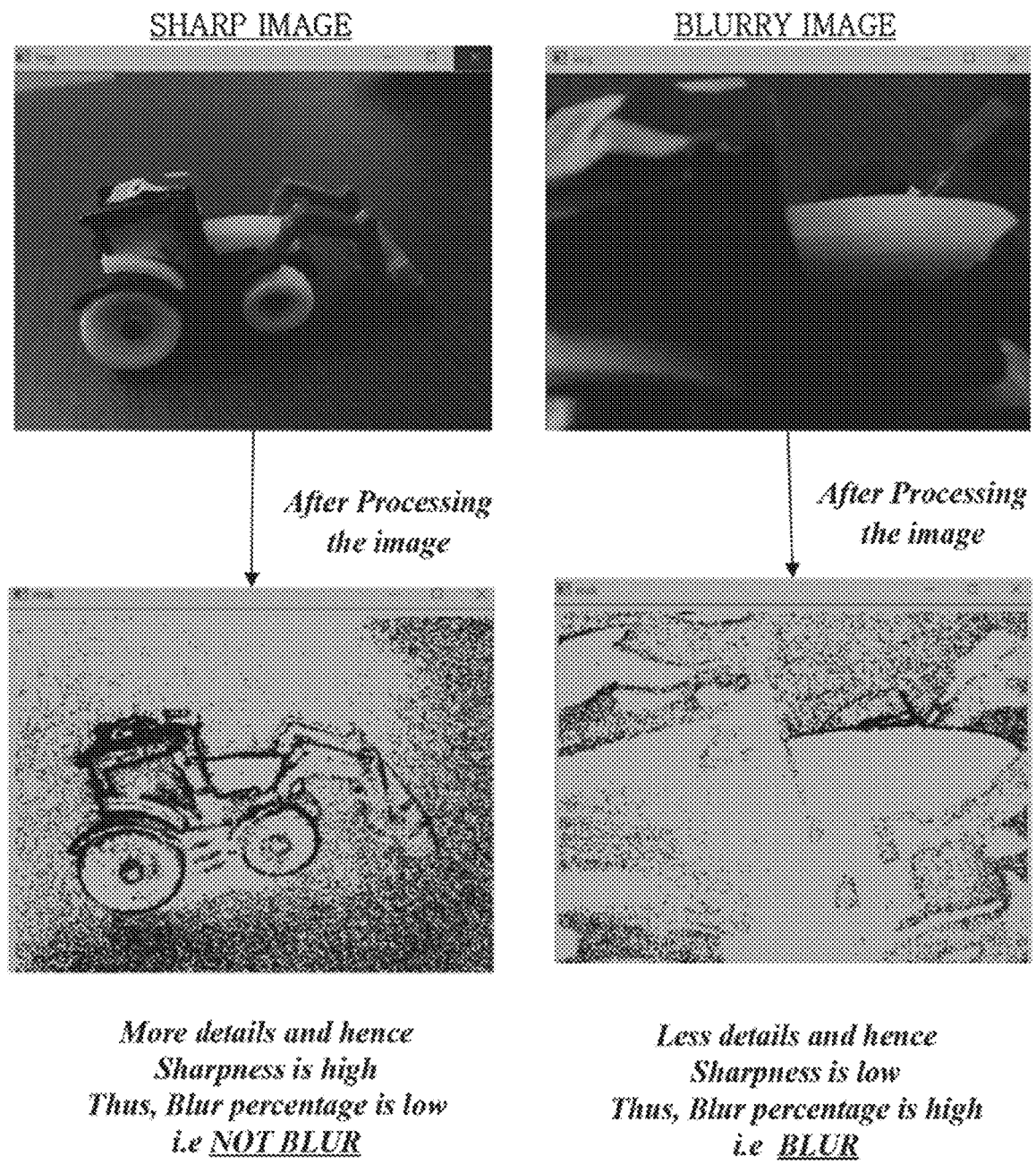
FIG. 5 is an example diagram depicting the blur detection and decision making to switch the electronic device between a macro sensing mode and a non-macro sensing mode, according to embodiments as disclosed herein.

FIG. 5 is an example diagram depicting the blur detection and decision to switch the electronic device 102 between macro sensing mode and the non-macro sensing mode, according to embodiments as disclosed herein. As illustrated in FIG. 5, the amount of blur is analyzed based on the number of details present in the scene to be captured. FIG. 5 illustrates an example image that is sharp and an example image that is blurry, which is obtained after the processing of the captured scene. For an example, the media acquisition unit 110 in the non-macro sensing mode, analyzes the blur present in the current frame. Based on the blur present in the current frame, the processor 108 determines whether the current camera is suitable for the scene. The media acquisition unit 110, based on determining that the amount of blur exceeds the pre-defined threshold, switches to the macro sensing mode. In a similar manner, when the media acquisition unit 110 is in the macro sensing mode, the media acquisition unit 110 can switch to the non-macro sensing mode based on determining that the blur occurring in the media (e.g., image, video, and the like) from the macro sensing mode exceeds the pre-defined threshold. The threshold value for each parameter (i.e., for blur detection-based scene analysis, focus data-based scene analysis, light condition based analysis) may be referred to as "blur threshold," "focus based threshold" and "light based threshold." The threshold value may be determined based on the imaging properties of the media acquisition unit 110 present in the electronic device 102.

As illustrated in FIG. 5, the blur detection-based scene analyzer 204 can calculate the amount of blur by processing the captured scene. The amount of blur can be calculated by determining the number of details present in the scene using image processing of the frames in media (e.g., image, video, and the like) or by use of the machine learning based solutions. For example, an edge detection method (image processing solution) can be used to determine the sharp edges in the captured frame and remove all the other pixels from the frame. Thus, based on the number of edges in the frame, the percentage of image which is sharp is determined. Therefore, the blur percentage can be calculated by complementing the sharpness percentage. Alternatively, machine learning based solutions can also be used to either calculate the amount of blur in the image or to classify the image as a blurry or a non-blurry image.

Further, the blur detection-based scene analyzer 204 can compare the blur percentage value to the threshold to determine whether the objects in the frame are blurred or not. The threshold value is determined based on the properties of the camera.

The face detection-based scene analyzer 206 determines the presence of human faces in the current frame (if any).

The face detection-based scene analyzer 206, based on determining the presence of human faces present in the frame, informs the processor 108. For example, the media acquisition unit 110, based on detecting at least one human face, informs the processor 108 about the presence of the at least one human face. Therefore, the processor 108 switches the media acquisition unit 110 to the non-macro sensing mode.

Figure 6:
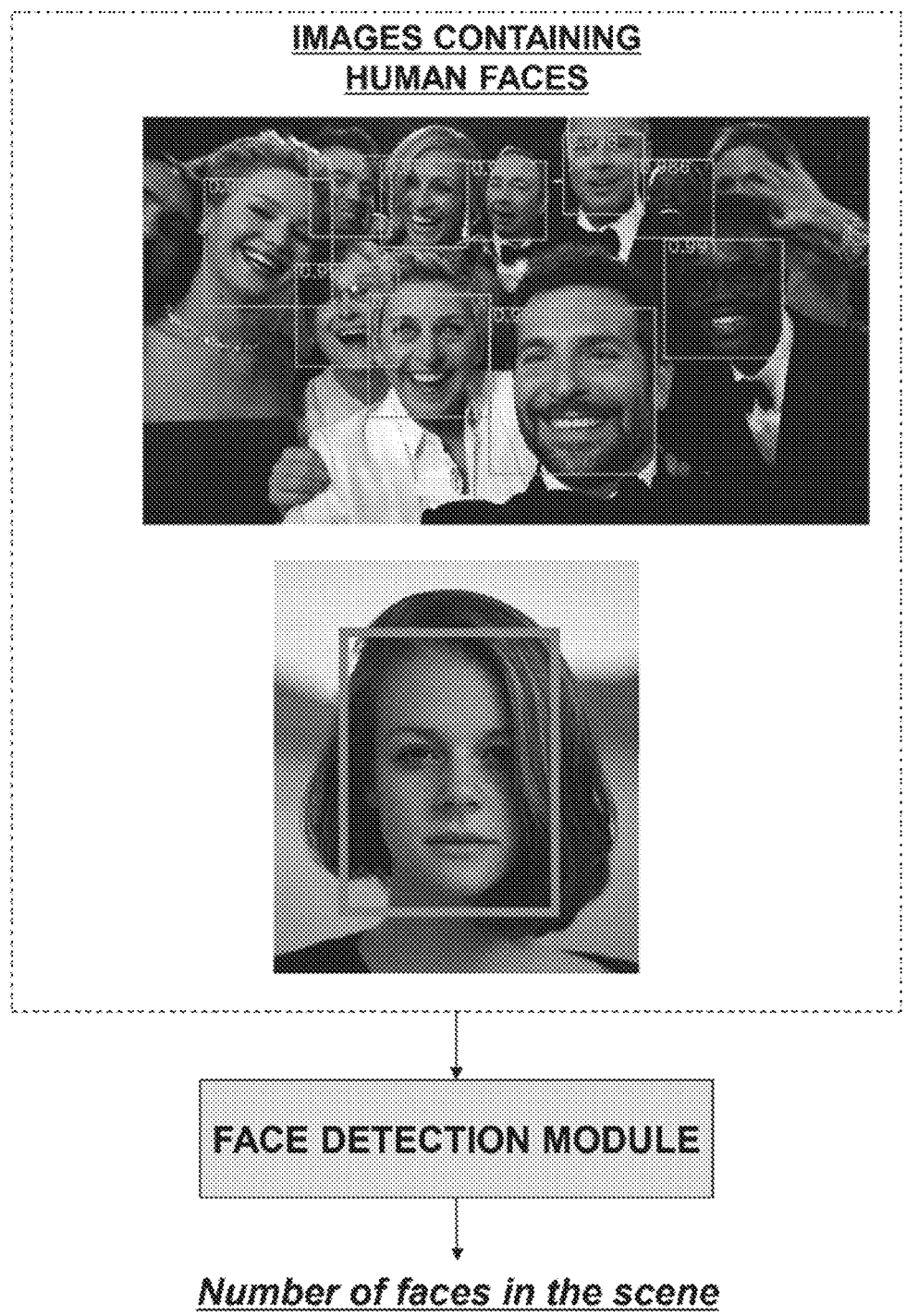
FIG. 6 is an example diagram depicting face detection to enhance the quality of media by switching between a macro sensing mode and a non-macro sensing mode of the electronic device, according to embodiments as disclosed herein.

FIG. 6 is an example diagram depicting the face detection to enhance the quality of media by switching between the macro sensing mode and the non-macro sensing mode of the electronic device 102, according to embodiments as disclosed. As illustrated in FIG. 6, the human faces are detected in the captured scene. In an embodiment, the face detection-based scene analyzer 206 is a component in the media acquisition unit 110, which is being used to capture the scene. The face detection-based scene analyzer 206 analyzes the frames in the scene from the non-macro camera to perform the human face segmentation. Further, the human face segmentation can be used by the face detection-based scene analyzer 206 to determine the presence of human faces present in the captured media. The processor 108, based on determining the presence of faces in the captured media, causes the media acquisition unit 110 to continue being in the non-macro sensing mode or to switch to the non-macro sensing mode.

As illustrated in FIG. 6, the face detection is performed by applying various methods and techniques on the captured image. In an embodiment herein, the face detection-based scene analyzer 206 can be present in the media acquisition unit 110. In an embodiment herein, the face detection-based scene analyzer 206 can detect the number of valid faces present in the captured frame of the scene based on the zoom value.

Figure 7:
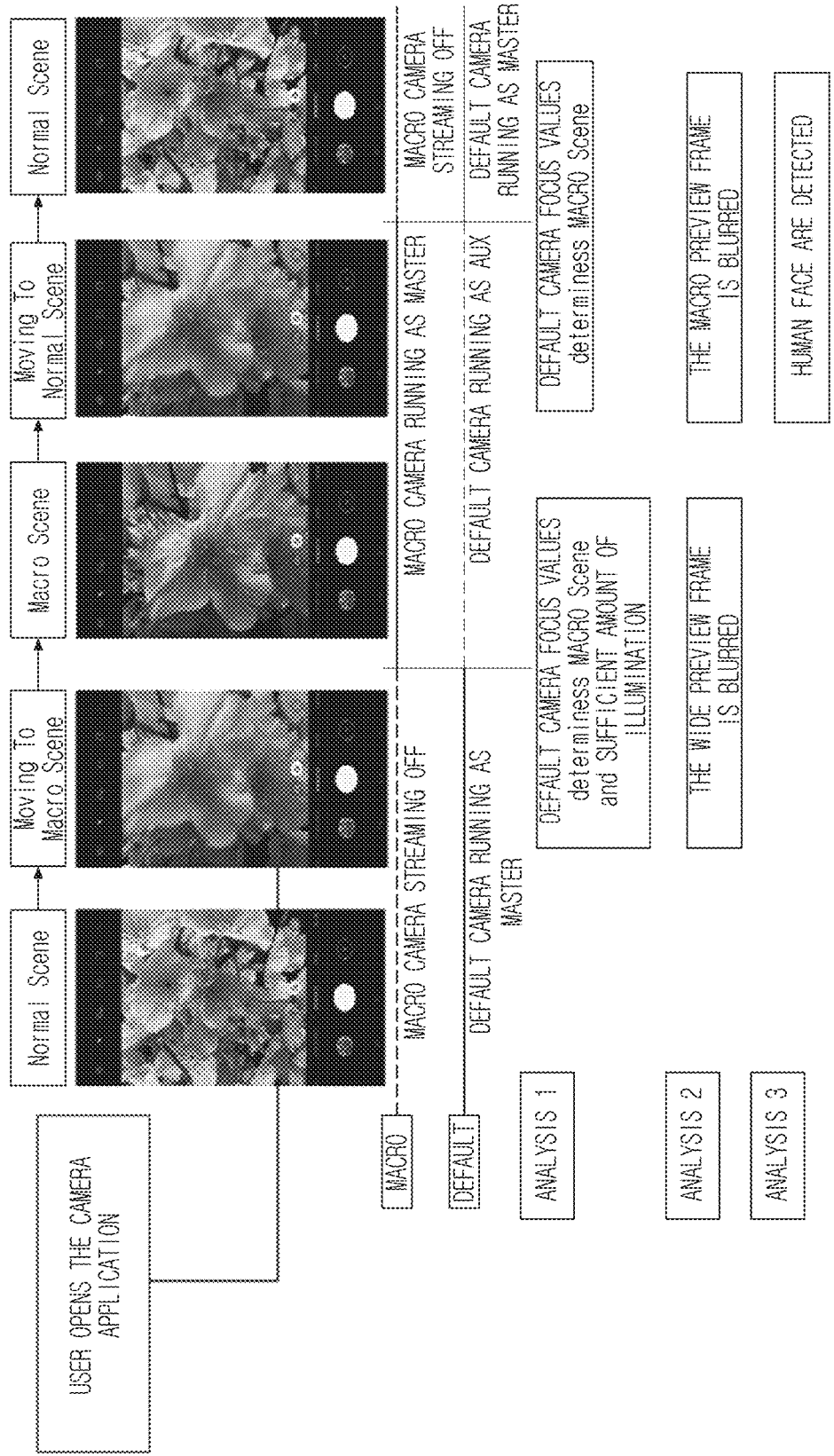
FIG. 7 is an example diagram depicting the analysis of the captured scene by configuring the macro sensor and non-macro sensor to run in the background of the electronic device, according to embodiments as disclosed herein.

FIG. 7 is an example diagram depicting the analysis of the captured scene by configuring the macro sensor and the non-macro sensor to run in the background of the electronic device 102. As illustrated in FIG. 7, consider that the user moves the camera closer to the object. The analysis of the parameters runs in parallel in the background of the electronic device 102. The processor 108 identifies the blur present in the scene to be captured. The focus data is analyzed and it is determined if there is sufficient light to capture the macro scene. Also, the face detection-based scene analyzer 206 detects the human faces present in the scene (if any), and may cause the processor 108 to switch from non-macro camera to the macro camera. Also, the face detection-based scene analyzer 206 provides the face detection data. Thus, the obtained face detection data determines the number of human faces present in the scene to be captured. Based on determining the sensing mode for which the scene is to be captured, immediate switching to the determined mode is performed. Similarly, the analysis is made to switch from the non-macro sensing mode to the macro sensing mode when the user moves the camera away from the object.

Figure 8:
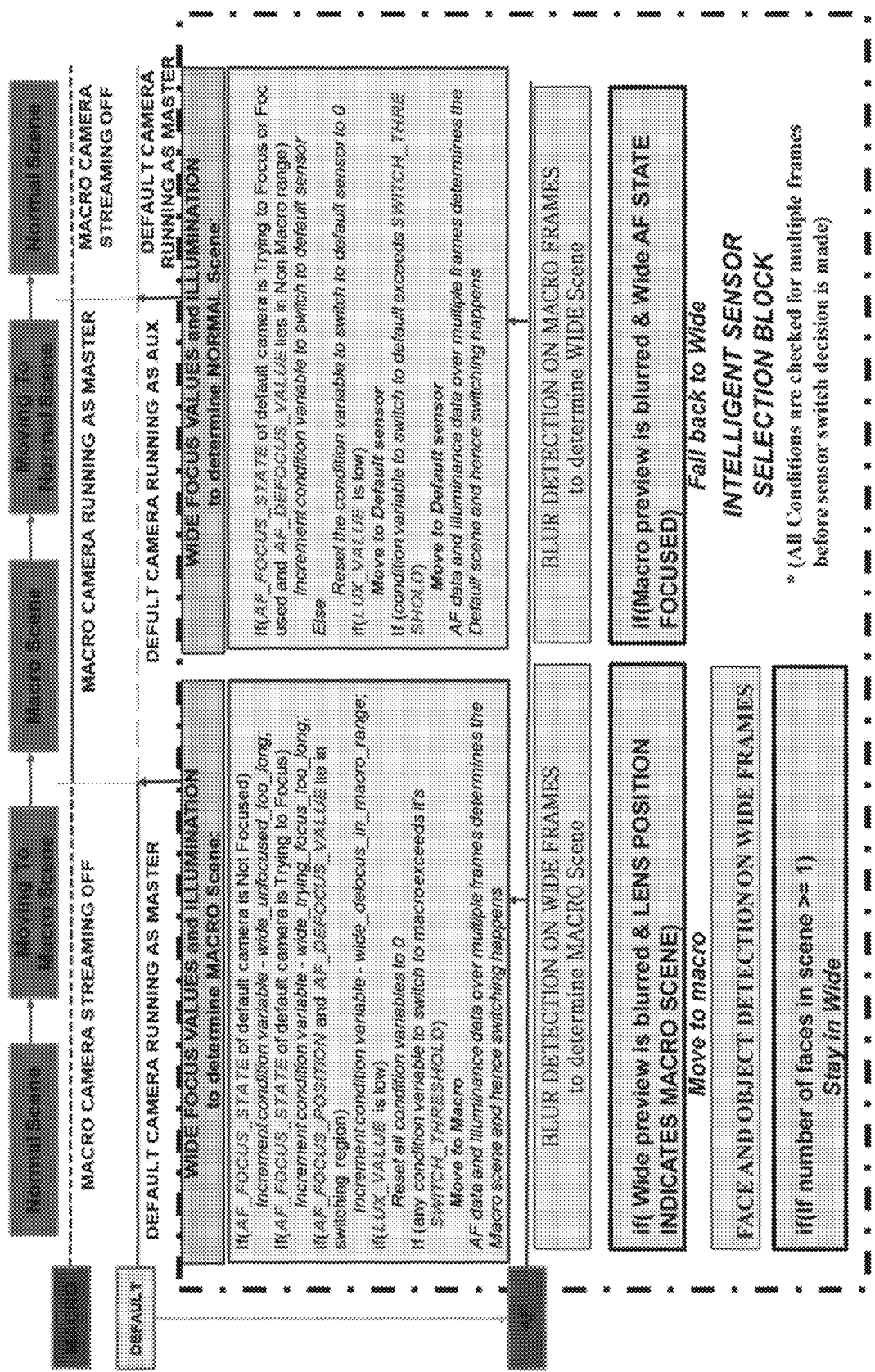
FIG. 8 is an example diagram depicting the selection of camera based on the analysis of the captured scene in real-time, according to embodiments as disclosed herein.

FIG. 8 is an example diagram depicting the selection of a camera based on the analysis of the scene to be captured in real-time, according to embodiments as disclosed. As illustrated in FIG. 8, the captured scene is sent as input to each of the analysis modules and based on the analyzed parameters, the output is sent to the processor 108. In FIG. 8 the captured scene is sent to focus data-based scene analyzer 202, analysis is performed by focus parameters such as relative lens position, auto focus state, de-focus state, and the light condition.

As illustrated, in the focus data-based scene analyzer 202, the relative lens position parameter signifies the position of the lens on the actuator rail. The relative lens position approximates whether the camera is near to the scene or far from it. The processor 108 tracks the relative lens position of the media acquisition unit 110. The relative lens position is smaller in situations where the object is closer. As the media acquisition unit 110 moves away from the object, the value of the relative lens position will be incremented, to signify that the object is moving away from the media acquisition unit 110. For example, the value of the relative lens position 0 signifies that the sensor is trying to focus on a very close object. In a similar manner, the maximum value of lens position signifies that the sensor is trying to focus on a very far away object (infinity).

Based on the focus state of the macro camera or the non-macro camera, the processor 108 determines the switching between the macro sensing mode and the non-macro sensing mode. The de-focus state of the media acquisition unit 110 determines the phase difference value between the phase difference pixels in the captured scene. The processor 108, based on determining that the phase difference value of the pixels captured from the scene is negative, considers the object to be closer. The processor 108, based on determining that the phase difference value of the pixels captured from the scene is non-negative, considers the object to be further away from the media acquisition unit 110.

The light condition determines the illumination of the current scene. The processor 108 also checks if the currently available light is sufficient to capture the objects in the macro or non-macro sensing mode.

The blur detection-based scene analyzer 204 analyzes the amount of blur present in the preview of the scene to be captured. For example, when the media acquisition unit 110 is in the macro sensing mode and the blur present in the macro preview of the scene exceeds the threshold level, the processor 108 determines that the scene is to be captured using the non-macro sensing mode. For example, when the media acquisition unit 110 is in the non-macro sensing mode and the blur present in the non-macro preview of the scene exceeds the threshold level, the processor 108 determines that the scene is to be captured using the macro sensing mode. When the blur does not exceed the threshold value, the sensing mode is not changed. The threshold value depends on the electronic device 102, macro camera, non-macro camera, and the media acquisition unit 110.

The face detection-based scene analyzer 206 determines the number of human faces in the captured frame. The face detection-based scene analyzer 206, based on determining the number of human faces present in the scene, initiates the processor 108 to either retain the current mode (if the current mode is the non-macro sensing mode) or switch to the non-macro sensing mode (if the current mode is the macro sensing mode).

As illustrated in FIG. 8, output from each of the analyzed parameters are collected. All the analysis modules run in parallel in the background of the electronic device 102. All the conditions for the multiple frames present in the scene should be satisfied to perform the switch.

Figure 9:
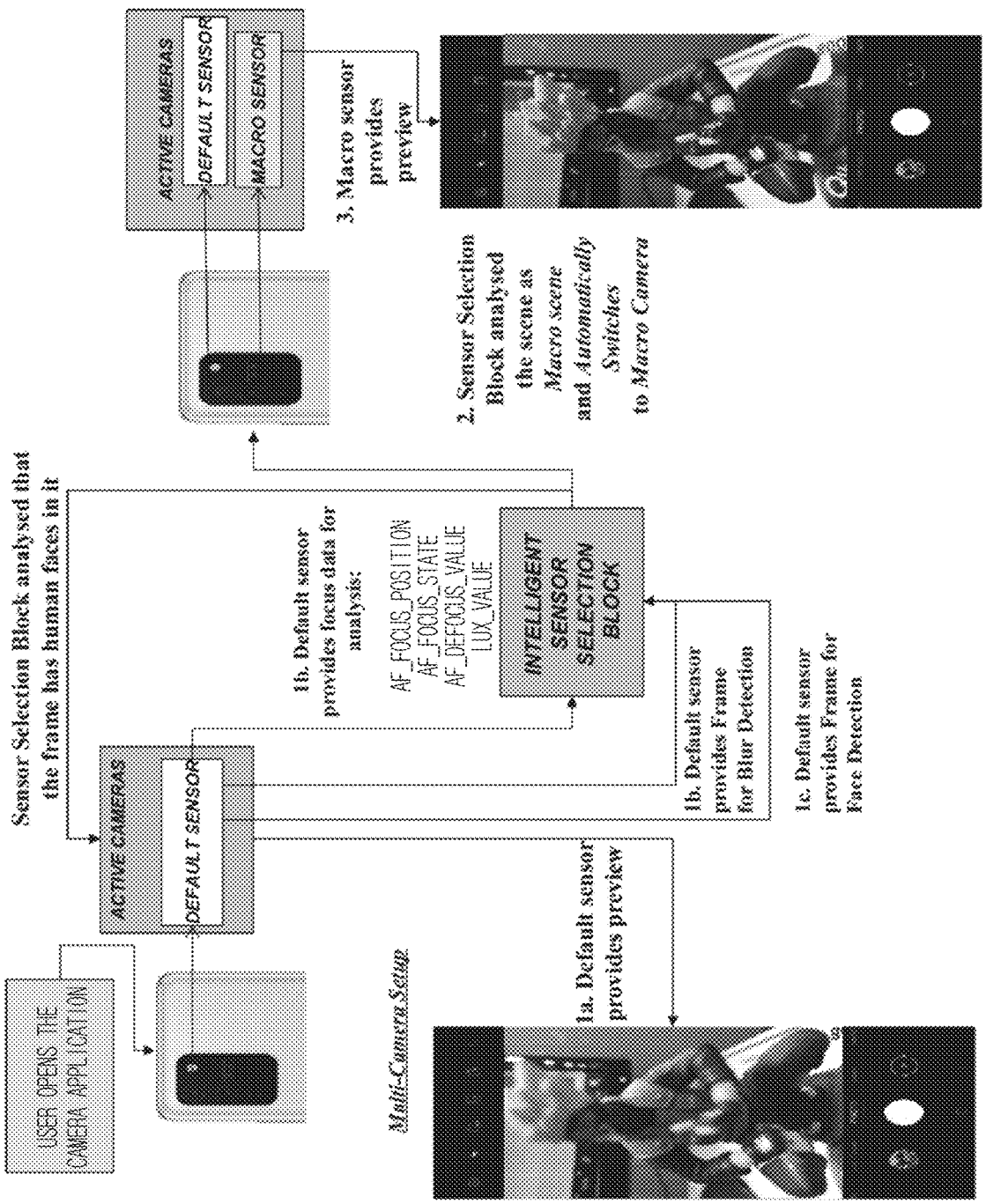
FIG. 9 is an example diagram depicting the analysis of the captured scene based on various parameters such as focus data-based scene analysis, Blur Detection based scene analysis and face-detection based scene analysis for switching to the macro sensing mode, according to embodiments as disclosed herein.

FIG. 9 is an example diagram depicting the analysis of the captured scene based on various parameters such as focus data-based scene analysis, face-detection based scene analysis, according to embodiments as disclosed.

In an example as depicted in FIG. 9, the user opens the camera application to capture the scene, and the camera application using the non-macro sensor, non-macro camera, and non-macro sensing mode captures a preview of the scene. The sensor provides the preview of the captured scene along with focus data, blur data, and face data to the processor 108 of the electronic device 102. The sensor provides focus related data such as focus position, focus state, de-focus value, the light condition, blur related data, and face detection data to the processor 108 of the electronic device 102. The processor 108 analyzes the data provided by the sensor related to the preview of the captured scene. The processor 108 determines the scene to be a macro scene and performs the switch to the macro sensing mode using the macro camera.

Figure 10:
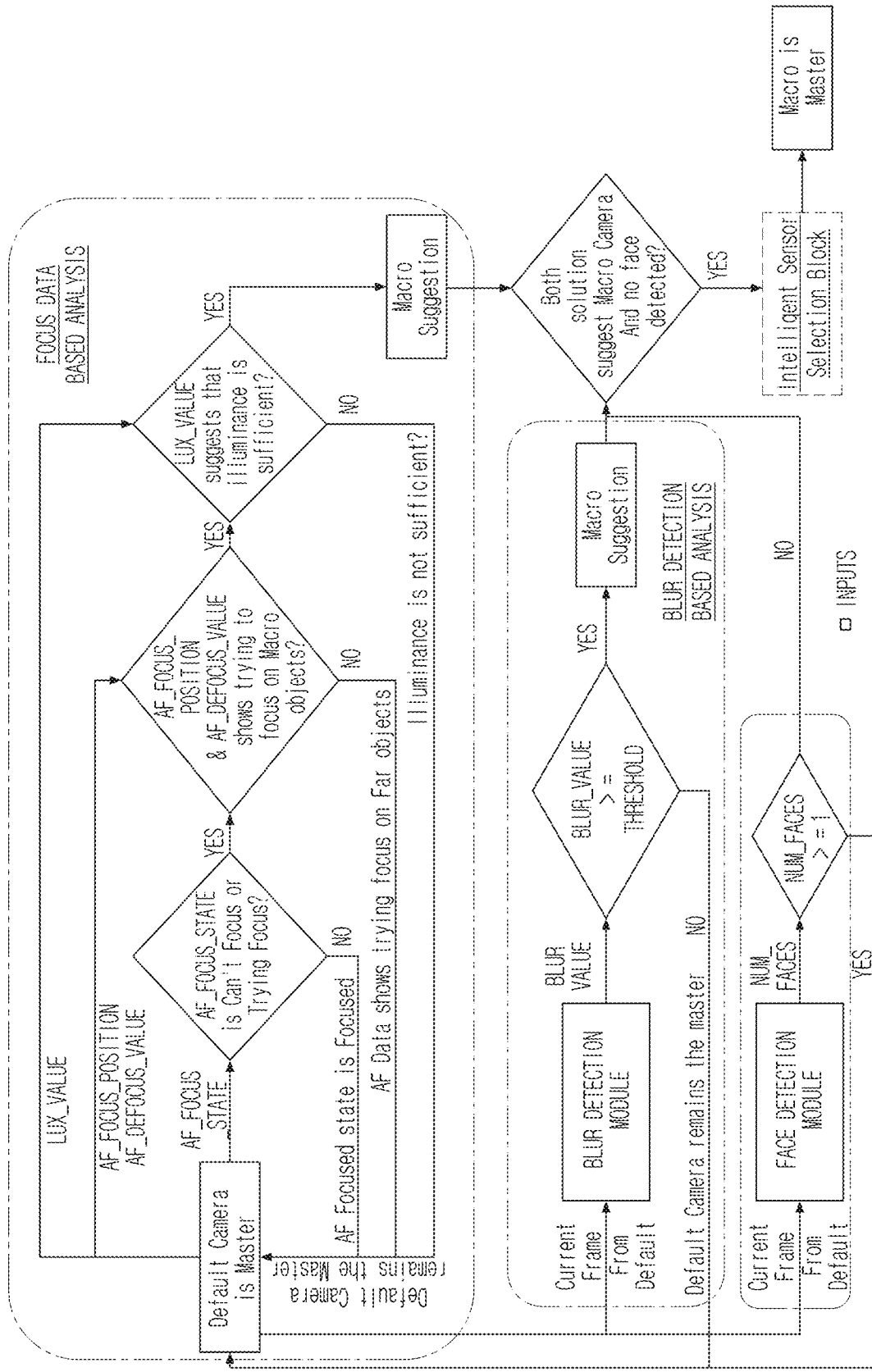
FIG. 10 is an example diagram illustrating the control flow for switching to the macro sensing mode based on various analysis parameters, according to embodiments as disclosed herein.

FIG. 10 is an example diagram illustrating the control flow for switching to the macro sensing mode based on the analyzed parameters, according to an embodiment as disclosed. The user opens the camera to initiate the process of capturing the scene, wherein the non-macro camera and non-macro sensing mode are active. The processor 108 of the electronic device 102 analyzes the parameters based on the data provided by the non-macro camera. The data provided by the non-macro camera can include focus related data, such as, but not limited to, focus position data, de-focus data, focus state data, and so on. If the non-macro camera is able to focus properly on the scene, the control flows back to the default camera. Based on losing focus on one or more objects in the scene, the analysis is performed whether the camera is trying to capture a macro-object or not. Assume that, in the current example, the user is trying to capture a macro scene.

A check is made whether there is sufficient light to capture the scene. Assume that, in the current example, there is sufficient light to capture the macro scene.

The preview of the scene is analyzed for detecting blur and faces in the preview of the scene. Assume that the determined value of the blur exceeds the threshold value and there are no faces detected in the preview of the scene.

As illustrated in the example in FIG. 10, based on the analyzed parameters (which happens in parallel), a decision is made that the scene is to be captured using a macro camera and a macro sensing mode. Because the electronic device 102 is currently using the non-macro camera and the non-macro sensing mode, the electronic device 102 switches to using the macro camera and the macro sensing mode.

Figure 11:
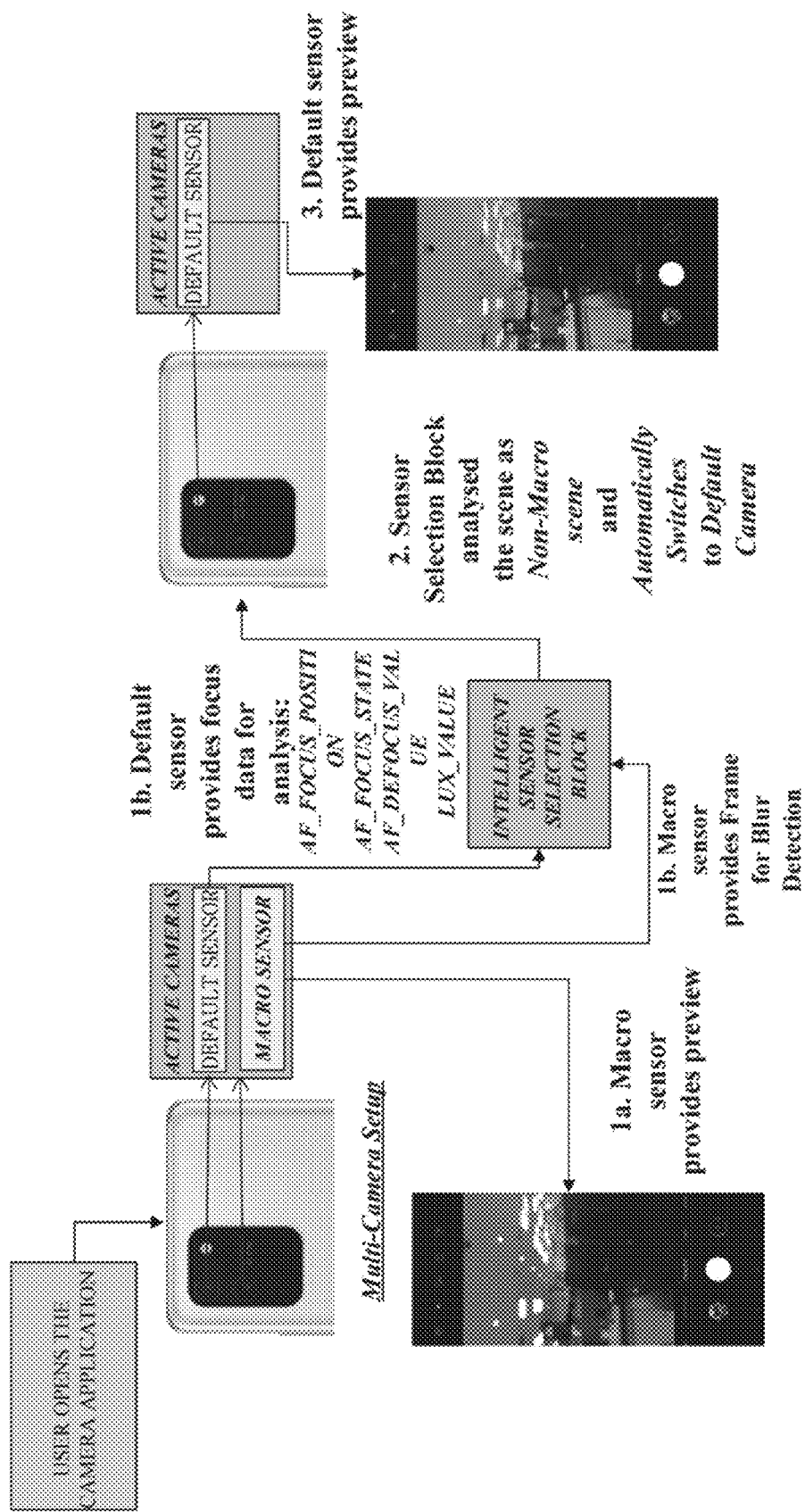
FIG. 11 is an example diagram depicting the analysis of the captured scene based on various parameters such as focus data-based scene analysis, Blur Detection based scene analysis and face-detection based scene analysis for switching to Non-macro sensing mode, according to embodiments as disclosed herein.

FIG. 11 is an example diagram depicting the analysis of the captured scene based on various parameters such as focus data-based scene analysis, face-detection based scene analysis, according to an embodiment as disclosed.

In an example as depicted in FIG. 11, the user opens the camera application to capture the scene, and the camera application using the macro sensor, macro camera, and macro sensing mode captures a preview of the scene. The macro sensor provides the preview of the captured scene along with blur data and face data to the processor 108 of the electronic device 102. The sensor with the autofocus module (either the macro camera or the non-macro camera) provides the focus related data such as focus position, focus state, de-focus value, the light condition, blur related data, and face detection data to the processor 108 of the electronic device 102. The processor 108 analyzes the data provided by the sensor related to the preview of the captured scene. Assume that the processor 108 determines the scene to be non-macro, and performs the switch to the non-macro camera and the non-macro sensing mode.

Figure 12:
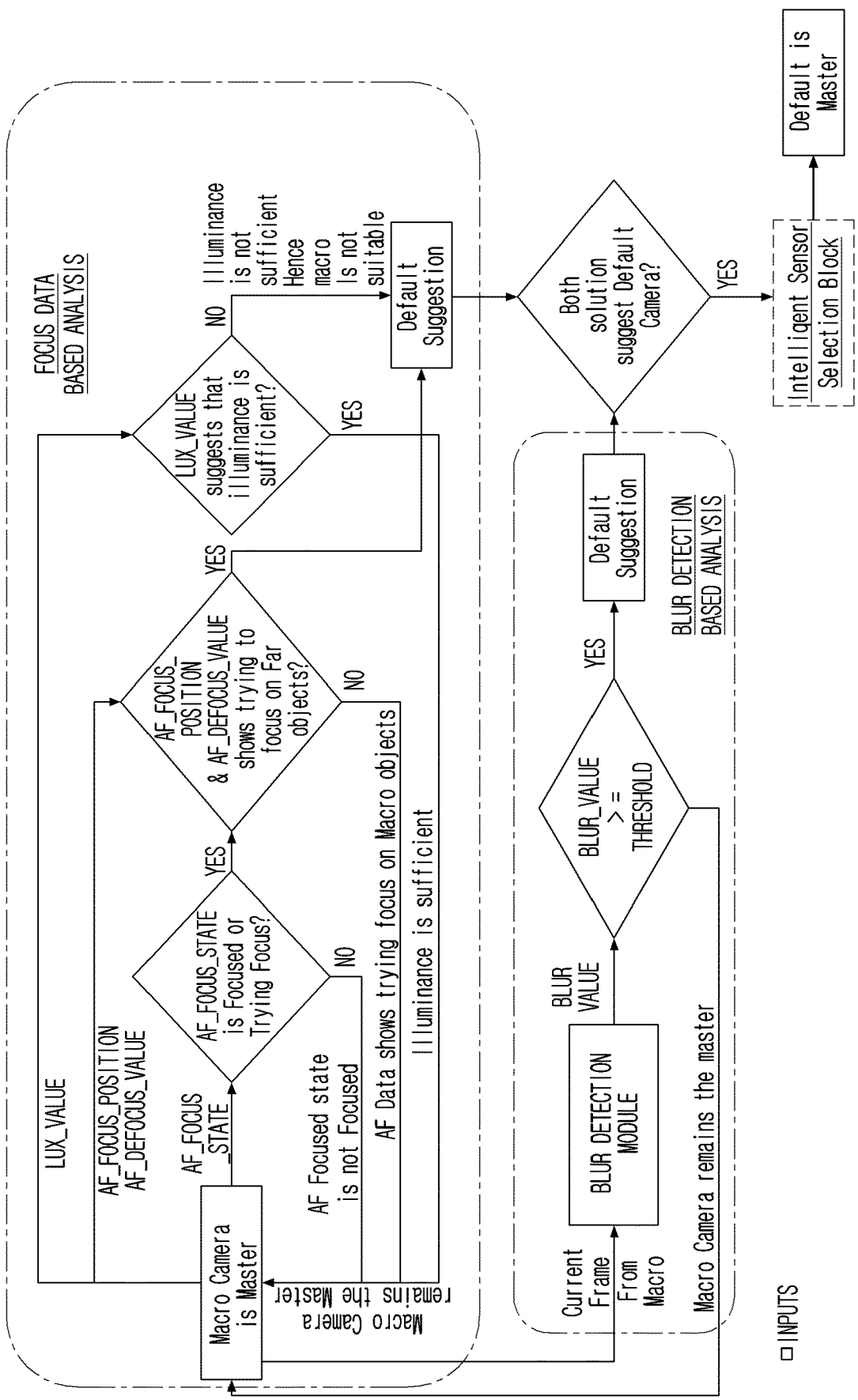
FIG. 12 is an example diagram illustrating the control flow for switching to the non-macro sensing mode based on various analysis parameters, according to embodiments as disclosed herein.

FIG. 12 is an example diagram illustrating the control flow for switching to the non-macro sensing mode based on the analyzed parameters, according to an embodiment as disclosed. The user opens the camera to initiate the process of capturing the scene, wherein the macro camera and macro sensing mode are active. The processor 108 of the electronic device 102 analyzes the parameters, based on the data provided by the non-macro camera. Assuming that the autofocus module is present in the non-maco camera, the data provided by the non-maco camera can include focus related data, such as, but not related to, focus position data, de-focus data, focus state data, and so on. If the non-macro camera is still not able to focus properly on the scene from the default camera, the control flows back to the macro camera. Based on gaining focus on one or more objects in the scene, the analysis is performed whether the camera is trying to capture a non-macro object or not. Assume that, in the current example, the user is trying to capture a non-macro scene.

If sufficient light to capture the scene from macro camera is not present, the control flows back to default camera.

The preview of the scene (from the macro sensor) is analyzed for detecting blur and faces in the preview of the scene. Assume that the determined value of the blur exceeds the threshold value in the preview of the scene.

As illustrated in the example in FIG. 12, based on the analyzed parameters (which happens in parallel), a decision is made that the scene is to be captured using a non-macro camera and a non-macro sensing mode. Because that the electronic device 102 is currently using the macro camera and the macro sensing mode, the electronic device 102 switches to the non-macro camera and the non-macro sensing mode.

Figure 13:
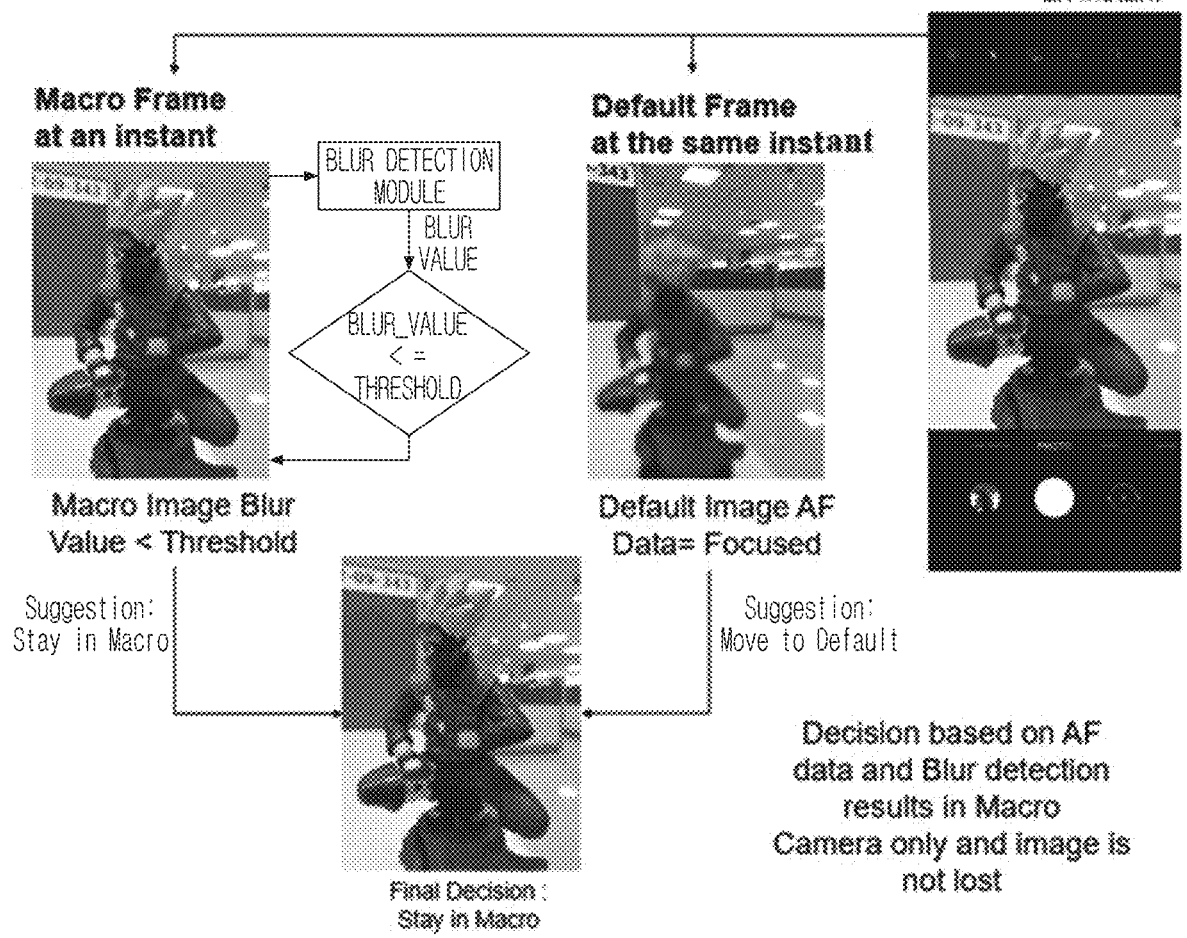
FIG. 13 is an example diagram depicting the blur detection and focus detection to prevent the false switch between the macro and the non-macro sensing mode of the electronic device, according to embodiments as disclosed herein.

FIG. 13 is an example diagram depicting the blur detection and focus detection to prevent the false switching between the macro and non-macro sensing modes, according to an embodiment as disclosed. The user opens the camera application to capture a scene and the processor 108, based on determining that the scene is a macro scene, switches to the macro sensing mode. After switching to the macro sensing mode, the electronic device 102 can be adjusted by the user to capture different angles of the macro-object.

As depicted in the example in FIG. 13, wherein the macro sensor and the macro sensing mode are active to capture the macro-object, the macro frame captured at an instant and the non-macro frame captured at the same moment are as depicted. If only Focus Data based scene analysis from the non-macro sensor is performed, when a user moves the camera around the non-macro sensor is able to gain focus and might suggest a false switch to the non-macro sensing mode. Based on combining the result with the blur value calculated on the macro frame, which is less than the threshold value, the electronic device 102 can avoid such false switches. Thus, the user can adjust the electronic device 102 to obtain different angles of the macro-objects.

Embodiments herein perform switching between the modes automatically without any extra hardware components such as time of flight (TOF) sensors, and the like. Also, the solution is independent of the type of autofocus module.

Embodiments herein test multiple frames of the scene to be captured consecutively before initiating to perform the switch. Embodiments herein avoid false switches due to handshake, adjustment done by the user to focus the scene and the like. Embodiments herein work in real-time and independent of the user to select the optimal camera to capture the scene optimally. Embodiments herein overcome the hardware limitation to perform auto-focus of the macro-objects. This makes the approach highly competitive and cost effective to ensure that the captured images in different scenarios have best quality with the available sensor capabilities.

Embodiments herein utilize a plurality of cameras sensors having different focal lengths and field-of-views instead of a single electronically controlled camera having multiple mode operating capability. Embodiments herein utilize focus data from non-macro camera (or any camera with autofocus module) as an input to the intelligent sensor block to decide optimal camera in real-time. Therefore, by performing the switch, embodiments herein achieve a higher accuracy with high consistency to capture various scenes at different light conditions. Due to automatic switching of the camera and without using distance measuring hardware components, embodiments herein reduce the power consumption of the electronic device.

Figure 14:
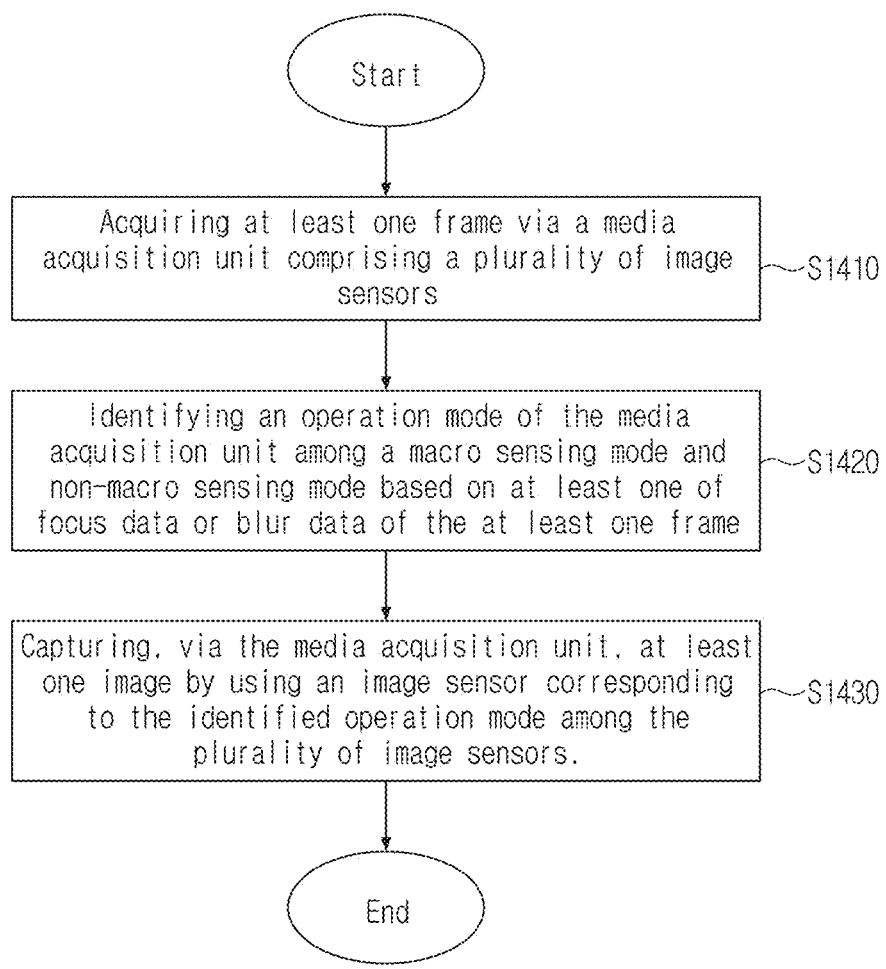
FIG. 14 is a flow diagram illustrating a method for analyzing and switching between at least one macro and at least one non-macro sensing mode for capturing macro and non-macro media in real-time, according to embodiments as disclosed herein.

FIG. 14 is a flow diagram illustrating a method for analyzing and switching between at least one macro sensing mode and at least one non-macro sensing mode for capturing macro and non-macro media in real-time, according to embodiments as disclosed herein.

At step S1410, the method includes, acquiring at least one frame via a media acquisition unit comprising a plurality of image sensors.

At step S1420, the method includes, identifying an operation mode of the media acquisition unit among a macro sensing mode and a non-macro sensing mode based on at least one of focus data or blur data of the at least one frame.

At step S1430, the method includes, acquiring, via the media acquisition unit, at least one image by using an image sensor corresponding to the identified operation mode among the plurality of image sensors.

The various actions, acts, blocks, steps, or the like, in the method and the flow diagram of FIG. 14 may be performed in the order presented, in a different order or simultaneously. Further, in some embodiments, some of the actions, acts, blocks, steps, or the like may be omitted, added, modified, skipped, or the like without departing from the scope of the present disclosure.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the scope of the embodiments as described herein.

What is claimed is:

1. An electronic device comprising:
a first camera;
a second camera;
a display; and
at least one processor configured to:
while obtaining a first plurality of images via the first camera and a second plurality of images via the second camera:
control the display to display a first preview based on the first plurality of images;
while the first preview based on the first plurality of images is being displayed on the display, obtain first information via the first camera and second information via the second camera; and
based on the first information and the second information, control the display to switch from displaying the first preview based on the first plurality of images to displaying a second preview based on the second plurality of images.

2. The device as claimed in claim 1, wherein the first plurality of images and the second plurality of images are captured simultaneously.

3. The device as claimed in claim 1, wherein the first information comprises data related to a focus of the first camera, and
wherein the second information comprises data related to a focus of the second camera.

4. The device as claimed in claim 3, wherein the first information is determined based on an analysis of images captured by the first camera, and
wherein the second information is determined based on a second phase difference value between phase difference pixels in the second camera.

5. The device as claimed in claim 3, wherein the first information further comprises data related to a light condition of the first camera, and the second information further comprises data related to a light condition of the second camera.

6. The device as claimed in claim 1, wherein the first information comprises data related to a light condition of the first camera, and
wherein the second information comprises data related to a light condition of the second camera.

7. The device as claimed in claim 1, wherein the at least one processor is further configured to, based on the first information indicating that the first camera is in a out of focus state and the second information indicating that the second camera is in a focus state, display, on the display, the second preview based on the second plurality of images.

8. An electronic device comprising:
a first camera configured to capture non-macro images;
a second camera configured to capture macro images;
a display; and
at least one processor configured to:
periodically obtain first information via the first camera and second information via the second camera,
identify in an ongoing manner, based on the periodically obtained first information and second information, a current operation mode of the electronic device from among a macro sensing mode and a non-macro sensing mode,
based on the identification of the current operation mode at a given point in time, obtain at least one first frame obtained by using a camera, from among the first camera and the second camera, corresponding to the current operation mode, and cause the at least one first frame to be displayed by the display,
determine in an ongoing manner, based on the periodically obtained first information and second information, whether the current operation mode changes, and
based on the determination that the current operation mode has changed, obtain at least one second frame obtained by using the other camera from among the first camera and the second camera, and cause the at least one second frame to be displayed by the display.

9. The device as claimed in claim 8, wherein the first information and the second information are obtained simultaneously.

10. The device as claimed in claim 8,
wherein the first information comprises data related to a focus of the first camera, and
wherein the second information comprises data related to a focus of the second camera.

11. The device as claimed in claim 10,
wherein the first information is determined based on a first phase difference value between phase difference pixels in the first camera, and
wherein the second information is determined based on a second phase difference value between phase difference pixels in the second camera.

12. The device as claimed in claim 10, wherein the first information further comprises data related to a light condition of the first camera, and the second information further comprises data related to a light condition of the second camera.

13. The device as claimed in claim 8,
wherein the first information comprises data related to a light condition of the first camera, and
wherein the second information comprises data related to a light condition of the second camera.

14. The device as claimed in claim 8, wherein the at least one processor is further configured to, based on the first information indicating that the first camera is in a de-focus state and the second information indicating that the second camera is in a focus state, cause the display to display at least one frame obtained by using the second camera.

15. A method for controlling an electronic device comprising a first camera and a second camera, the method comprising:
    while obtaining a first plurality of images via the first camera and a second plurality of images via the second camera:
        displaying a first preview based on the first plurality of images;
        while displaying the first preview based on the first plurality of images, obtaining first information via the first camera and second information via the second camera; and
        based on the first information and the second information, switch from displaying the first preview based on the first plurality of images to displaying a second preview based on the second plurality of images.

16. The method of claim 15, wherein the first plurality of images and the second plurality of images are captured simultaneously.

17. The method of claim 15,
wherein the first information comprises data related to a focus of the first camera, and
wherein the second information comprises data related to a focus of the second camera.

18. The method of claim 17,
wherein the first information is determined based on an analysis of images captured by the first camera, and
wherein the second information is determined based on a second phase difference value between phase difference pixels in the second camera.

19. The method of claim 15, wherein the first information is data related to a light condition of the first camera, and
wherein the second information is data related to a light condition of the second camera.

20. The method of claim 15, wherein the displaying the second preview further comprises, based on the first information indicating that the first camera is in a out of focus state and the second information indicating that the second camera is in a focus state, displaying the second preview based on the second plurality of images.

\* \* \* \* \*